United States Patent [19]
Liu et al.

[11] Patent Number: 5,964,863
[45] Date of Patent: Oct. 12, 1999

[54] METHOD AND APPARATUS FOR PROVIDING PIPE FULLNESS INFORMATION EXTERNAL TO A DATA PROCESSING SYSTEM

[75] Inventors: Chien-Yin Liu; Kirk S. Livingston, both of Austin, Tex.

[73] Assignee: Motorola, Inc., Schaumburg, Ill.

[21] Appl. No.: 08/632,208

[22] Filed: Apr. 15, 1996

[51] Int. Cl.[6] .................................................. G06F 9/22
[52] U.S. Cl. ............................................................ 712/32
[58] Field of Search .................................. 395/381, 800, 395/183.01, 500; 371/22.31, 22.5; 712/32

[56] References Cited

U.S. PATENT DOCUMENTS

| | | | |
|---|---|---|---|
| 3,813,531 | 5/1974 | King et al. | 714/46 |
| 3,838,260 | 9/1974 | Nelson | 714/25 |
| 4,034,194 | 7/1977 | Thomas et al. | 714/31 |
| 4,062,059 | 12/1977 | Suzuki et al. | 395/868 |
| 4,167,779 | 9/1979 | Sullivan et al. | 712/21 |
| 4,268,902 | 5/1981 | Berglund et al. | 710/129 |
| 4,346,452 | 8/1982 | Groves | 395/831 |
| 4,365,311 | 12/1982 | Fukunaga et al. | 395/555 |
| 4,482,953 | 11/1984 | Burke | 714/27 |
| 4,521,850 | 6/1985 | Wilhite et al. | 395/376 |
| 4,563,736 | 1/1986 | Boudreau et al. | 714/42 |
| 4,758,949 | 7/1988 | Wada et al. | 395/384 |
| 5,053,949 | 10/1991 | Allison et al. | 364/200 |
| 5,084,814 | 1/1992 | Vaglica et al. | 395/325 |
| 5,226,149 | 7/1993 | Yoshida et al. | 714/25 |
| 5,267,350 | 11/1993 | Matsubara et al. | 395/375 |
| 5,329,471 | 7/1994 | Swoboda | 364/578 |
| 5,375,216 | 12/1994 | Moyer et al. | 395/421 |
| 5,497,496 | 3/1996 | Ando | 395/800 |
| 5,499,350 | 3/1996 | Uchida et al. | 395/375 |
| 5,634,037 | 5/1997 | Sasaki et al. | 395/479 |
| 5,675,749 | 10/1997 | Hartivigsen et al. | 395/308 |
| 5,684,721 | 11/1997 | Swoboda et al. | 364/488 |

OTHER PUBLICATIONS

Motorola, Inc., "PowerPC 603e RISC Microprocessor User's Manual for Supplement for PowerPC 603 Microprocessor", Chapter 6, pp. 6–2 through 6–5 (1995).

Motorola, PoweRISControl MPC500 Family RCPR Reference Manual, RCPURM/AD, pp. 8–1 through 8–58, 1994.

Motorola, M68HC16 Family CPU16 Central Processor Unit Reference Manual, CPU 16RM/AD Rev 2, pp. 10–1 through 10–40, 1993.

Motorola, M68300 Family CPU32 CentralProcessor Unit Reference Manual, CPU32RM/AD REV 1, pp. 7–3 through 7–34, 1990.

*Primary Examiner*—David Y. Eng
*Attorney, Agent, or Firm*—Keith E. Witek

[57] ABSTRACT

The present invention relates in general to a data processing system (10), and more particularly to a method and apparatus for providing instruction pipe (106) status information, including fullness information, external to data processing system (10). In one embodiment, an IPIPE2 integrated circuit terminal (15) is used to serially provide a pipe depth value indicating the fullness of the instruction pipe (106). The serial protocol used with the IPIPE2 (15) terminal includes a start bit, a fetch pointer value, and a plurality of idle bits. In one embodiment, IPIPE0 (13) and IPIPE1 (14) integrated circuit terminals may indicate loading and unloading of instruction pipe (106) and may stop toggling when central processing unit (102) is in a loop mode.

31 Claims, 4 Drawing Sheets

| NINE-STAGE INSTRUCTION REGISTERS (130-137, 108) |||
|---|---|---|
| CONTENTS OF FETCH POINTER 116 | INSTRUCTION REGISTER | DATA |
|  | IR 108 | CURRENT INSTRUCTION |
| 000 | IR0 130 | DATA 1 |
| 001 | IR1 131 | DATA 2 |
| 010 | IR2 132 | DATA 3 |
| 011 | IR3 133 | DATA 4 |
| 100 | IR4 134 | (INCOMING DATA 5) |
| 101 | IR5 135 | (DATA 6) |
| 110 | IR6 136 | (DATA 7) |
| 111 | IR7 137 | (DATA 8) |

*FIG.4*

METHOD AND APPARATUS FOR PROVIDING PIPE FULLNESS INFORMATION EXTERNAL TO A DATA PROCESSING SYSTEM

REFERENCE TO RELATED APPLICATIONS

The present application is related to the following U.S. patent applications:

"Method And Apparatus For Providing An External Indication Of Internal Cycles In A Data Processing System", invented by Jay Hartvigsen et al., Ser. No. 08/458,390, filed Jun. 2, 1995, and assigned to the assignee hereof now U.S. Pat. No. 5,826,058.

FIELD OF THE INVENTION

The present invention relates in general to a data processing system, and more particularly to a method and apparatus for providing pipe fullness information external to a data processing system.

BACKGROUND OF THE INVENTION

Data processing systems, such as microcontroller or microprocessor integrated circuits, may have an internal instruction pipe which is used to queue incoming instructions that are to be executed. In order to facilitate hardware testing and software program debugging, it is useful for the data processor to provide pipe status information to the data processor's external bus. In this manner, test and debug equipment external to the data processor, such as a development system, is able to monitor status information regarding the instruction pipe.

Prior art data processors have provided pipe status information which indicated whether or not the instruction pipe was empty. This is often sufficient pipe status information for data processors that have short instruction pipes, such as one or two stages. However, this is usually insufficient information for data processors that have a deeper instruction pipe. Some prior art data processors that have deeper instruction pipes have provided pipe status information which indicated when the data processor had a change of instruction flow, that is when the instruction pipe required flushing because a jump or a branch instruction required the old instructions in the instruction pipe to be removed without being executed. As an example, some members of the MC68HC16 and MC68300 families of microcontrollers, available from Motorola, Inc. of Austin, Tex., are able to provide this type of pipe status information on the external bus.

However, for data processors that have instruction pipes deeper than one or two stages, providing pipe status information indicating when the data processor had a change of instruction flow (i.e. indicating when the pipe must be flushed) may not be sufficient for the development system to quickly synchronize with the instruction execution within the data processor. For example, if the software code being executed by the data processor executes a significant amount of straight line code before a branch or jump is encountered, the development system may not be able to quickly synchronize with the data processor and may not be able to quickly determine which instruction the data processor is currently executing.

In some situations, a long delay in synchronizing the development system to the execution of instructions in the data processor may significantly hamper testing and debugging of the data processor. A solution was needed which would allow user visibility to pipe status information as real-time as possible, while allowing the development system to quickly synchronize with instruction execution in the data processor. Quick synchronization would allow the development system to determine which instruction is currently being executed so that instruction tracking may begin as soon as possible. Of course, it is important that the provision of pipe status information not significantly impact the internal operation and speed of the data processor.

BRIEF DESCRIPTION OF THE DRAWINGS

FIG. 4 illustrates, in tabular form, the relationship between the fetch pointer value 116 and the fullness of instruction pipe 106 at fetch #2 of FIG. 3 in accordance with one embodiment of the present invention.

DESCRIPTION OF THE PREFERRED EMBODIMENT

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
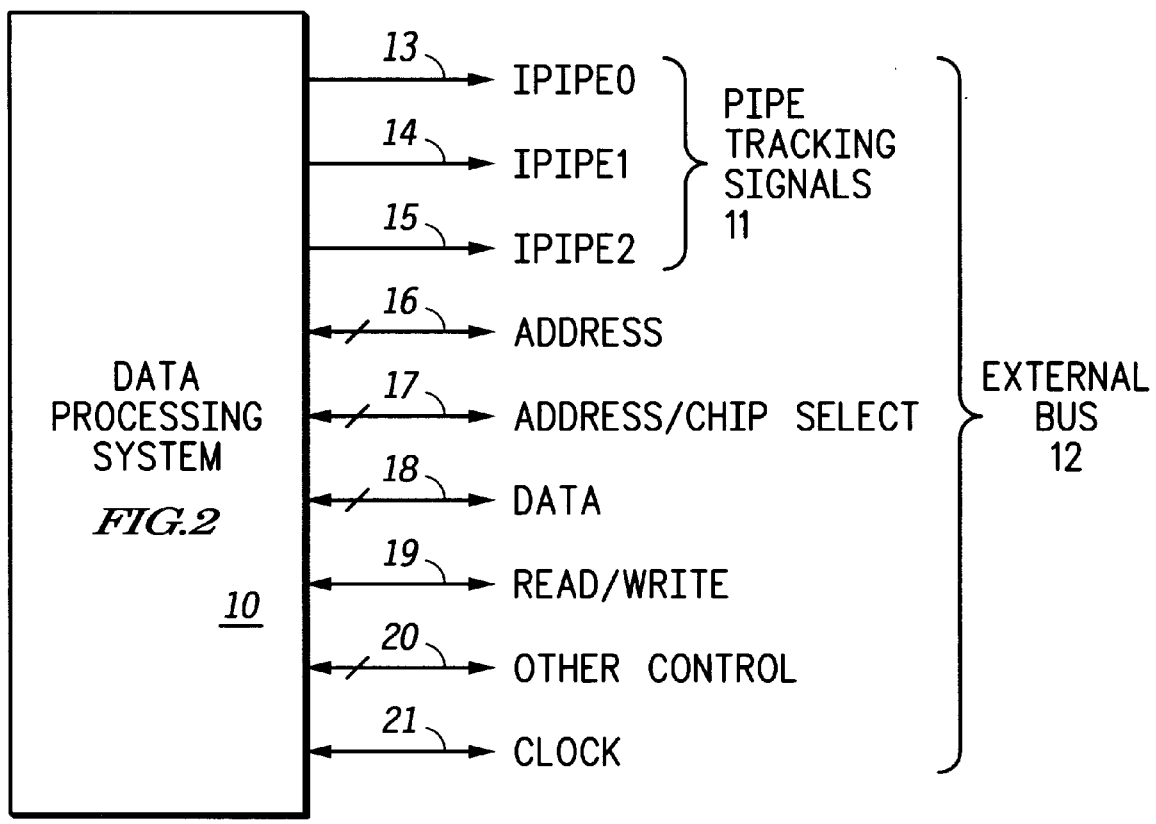
FIG. 1 illustrates, in block diagram form, a data processing system 10 and external bus 12 in accordance with one embodiment of the present invention.

FIG. 1 illustrates a data processing system 10 which is bi-directionally coupled to an external bus 12. In one embodiment of the present invention, external bus 12 includes the following signals: pipe tracking signals 11 which are transferred by way of conductors 13–15, address signals which are transferred by way of conductors 16, address/chip select signals which are transferred by way of conductors 17, data signals which are transferred by way of conductors 18, a read/write signal is transferred by way of conductor 19, a clock signal which can represent either an internal or external clock is transferred by conductor 21, and other control signals which are transferred by way of conductors 20. In one embodiment of the present invention, the address signals 16, the data signals 18, the read/write signal 19, and the other control signals 20 are bidirectional, while the remaining signals are provided by data processing system 10 to external bus 12.

Still referring to FIG. 1, in one embodiment of the present invention, pipe tracking signals 11 include the following signals: an IPIPE0 signal which is transferred external to data processing system 10 by way of conductor 13, an IPIPE1 signal which is transferred external to data processing system 10 by way of conductor 14, and an IPIPE2 signal which is transferred external to data processing system 10 by way of conductor 15.

Figure 2:
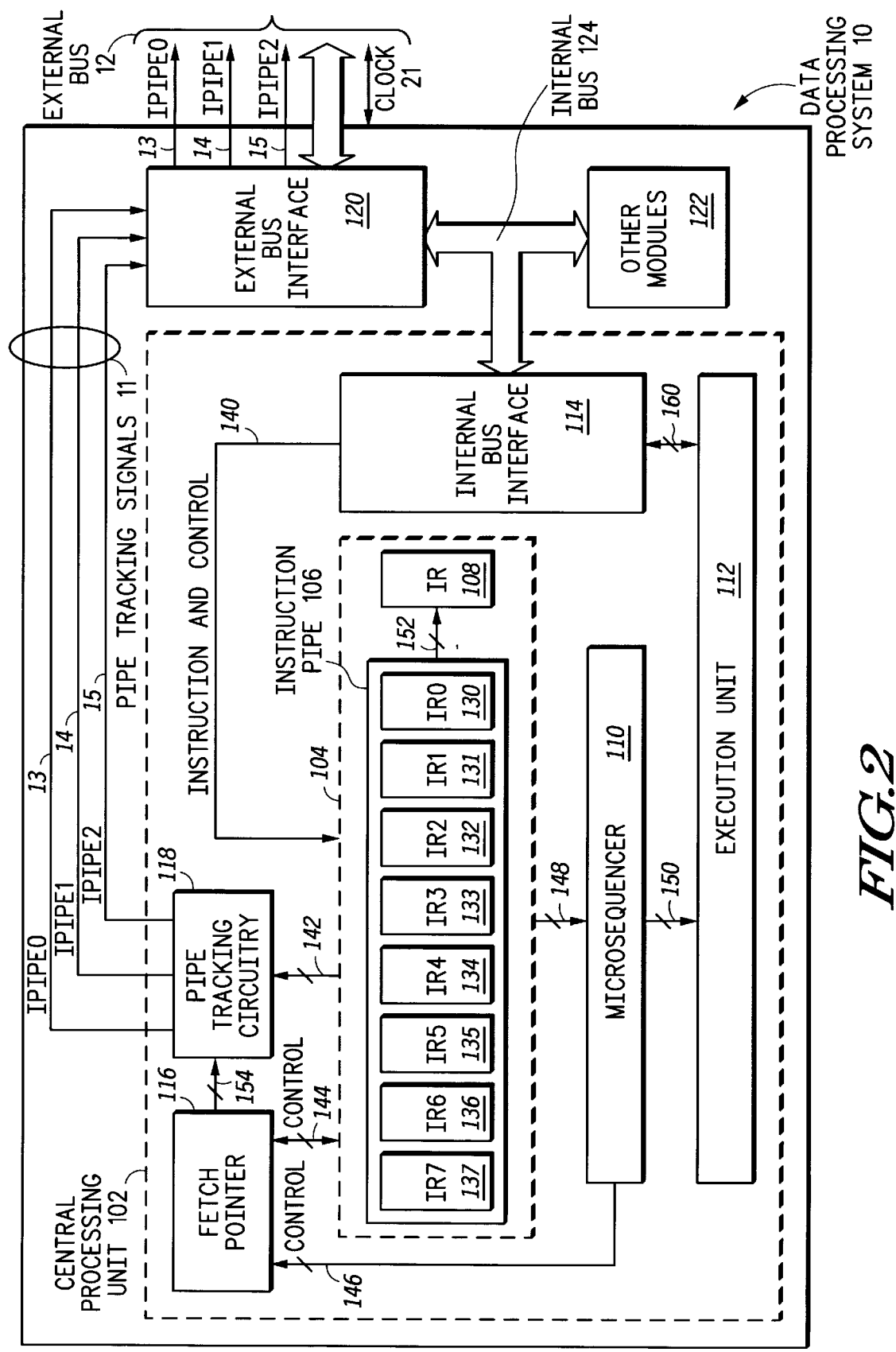
FIG. 2 illustrates, in block diagram form, a data processing system 10 of FIG. 1 in accordance with one embodiment of the present invention.

FIG. 2 illustrates, in block diagram form, one embodiment of a data processing system 10. The data processing system 10 includes a central processing unit 102, an external bus interface 120, other modules 122 as needed, and an external bus 12. Central processing unit 102 generates pipe tracking signals 11, which includes IPIPE0 13, IPIPE1 14 and IPIPE2 15, in one embodiment of the present invention. Alternate embodiments of the present invention may use more or fewer pipe tracking signals 11. The pipe tracking signals 11 couple the central processing unit 102 to the external bus interface 120. In turn, the external bus interface 120 asserts signals representing IPIPE0, IPIPE1, and IPIPE2 as part of the external bus 12. External bus 12 also contains other control signals and data signals, and clock signal 21. The external bus interface 120 is coupled to the central processing unit 102 by bus 124. In addition, bus 124 couples the external bus interface 120 and the central processing unit 102 to any other modules 122 in the system.

The pipe tracking signals 11 from the central processing unit 102 are used to identify the status instructions within the central processing unit 102. This signal information is presented external to the chip on the external bus 12.

The central processing unit 102 contains a fetch pointer 116, a pipe tracking circuit 118, an instruction pipe 106, an instruction register 108, a microsequencer 110, an execution unit 112, and an internal bus interface 114. The pipe tracking circuit 118 is coupled to the fetch pointer 116 by data line 154, and block 104 by data line 142, which is the combination of the instruction pipe 106 and instruction register 108. In addition, pipe tracking circuitry 118 provides the pipe tracking signals 11 to the external bus interface 120. The instruction pipe 106 is coupled to the fetch pointer 116 by data line 144, the microsequencer 110 by data line 148, the instruction register 108 by data line 152, and the internal bus interface 114. The microsequencer is coupled to the block 104 containing the instruction pipe 106 and instruction register 108 by data line 148, the fetch pointer 116 by data line 146, and the execution unit 112 by data line 150. The execution unit 112 is coupled to the microsequencer 110 by data line 150, and the internal bus interface 114 by data line 160. The fetch pointer 116 is coupled to the microsequencer 110 by data line 146, the instruction pipe 106 by data line 144, and the pipe tracking circuitry 118 by data line 142. The internal bus interface 120 is coupled to the block 104, and the execution unit 112 by data line 160, and provides interfaces to the internal bus 124.

In operation, the external bus 12 provides instructions to the external bus interface unit 120. The external bus interface 120 interfaces with the internal bus interface 114 to provide instructions and control information allowing the instruction pipe 106 to be filled with the correct instructions. For example, if instruction pipe 106 were empty, the internal bus interface 114, operating in unison with the external bus 12, would receive a first instruction and load it into the instruction register labeled IR0. The next fetched instruction would be loaded into instruction register IR1, provided the instruction at IR0 had not been dispatched to the instruction register 108. This instruction loading process continues in a normal fashion until all instruction registers are full or no new instructions are available. As instructions are dispatched, or executed, they are loaded from IR0 into the instruction register 108. When this occurs, the data in each of the other instruction registers IR1 through IR7 are moved into the next adjacent instruction register; thereby moving closer to the instruction register 108. The fetch pointer 116 keeps track of the next available instruction register. The next available instruction register is the location where the next fetched instruction will be stored. Alternate embodiments of the present invention may use a fetch pointer 116 that stores a different value, such as the last instruction register containing a pending instruction.

The microsequencer 110 controls execution of the instruction in register IR 108. When the instruction in IR 108 is completed, the microsequencer 110 will retire that instruction, allowing the instruction in IR0 to be dispatched, and the remaining instructions registers IR1–IR7 to be advanced. These events are monitored by the fetch pointer 116 so that the next available location for an instruction in the instruction pipe 106 is identified. Also, the fetch pointer 116 monitors the receipt of instructions from internal bus interface 114 so that the next available instruction register is always pointed to by fetch pointer 116. The pipe tracking circuitry 118 monitors the fetch pointer value of fetch pointer 116. In accordance with the present invention, the pipe tracking circuitry 118 generates a serial output signal on pipe tracking signal IPIPE2 15. This signal communicates to external bus 12 which instruction register is the next available register. This information is synchronized to the clock 21 and provided to the external bus interface 120 which provides the information on external bus 12 at the integrated circuit terminal labeled IPIPE2. While the instruction pipe 106 status is transmitted serially in order to minimize the number of needed terminals, it is understood that alternate embodiments could use a plurality of pins to provide the information.

Figure 3:
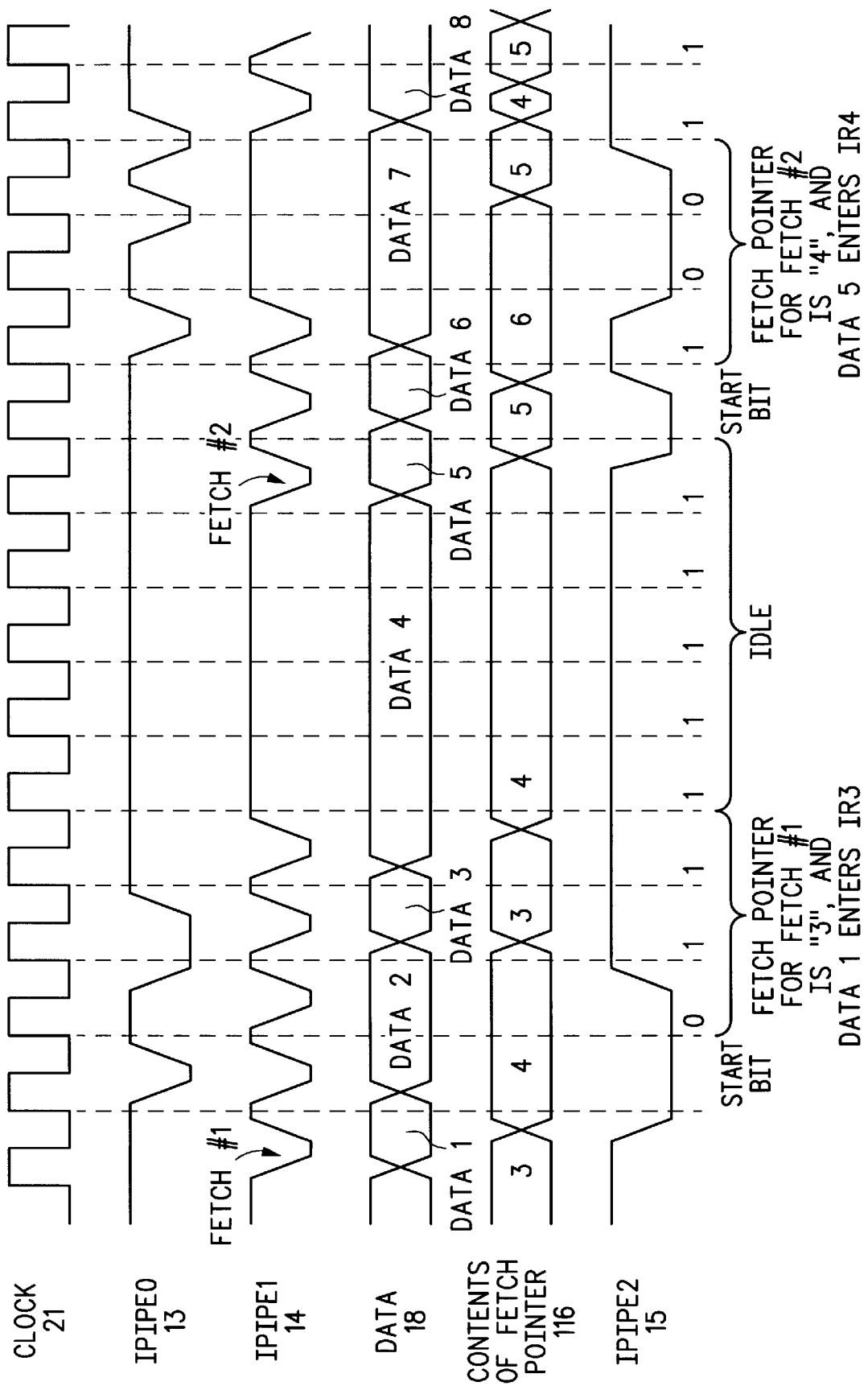
FIG. 3 illustrates, in timing diagram form, a portion of external bus signals 12 and the contents of fetch pointer 116 in accordance with one embodiment of the present invention.

FIG. 3 illustrates in timing diagram form the operational relationship of the clock 21, IPIPE0–IPIPE2 11, data 18, which represents a portion of internal bus 124, and the fetch pointer value contained within fetch pointer 116. Clock 21 represents an external clock or an internal clock. The clock signal 21 serves to synchronize the operation of data processing system 10, including the pipe tracking signals 11, data 18, and fetch pointer 116. IPIPE0 13 serves to indicate when the instruction registers of the instruction pipe 106 are being retired. When IPIPE0 is low on either the rising edge or the falling edge of clock 21, it indicates the retirement of an instruction in the instruction pipe 106. This may also be thought of as indicating when the instruction registers IR0–IR7 are being advanced by one. Therefore, in FIG. 3, IPIPE0 13 during the falling edge of the second clock cycle of clock 21 is shown to be low. This indicates that an instruction register advance has occurred. During the rising edge of the next clock cycle, it is shown that IPIPE0 13 is active high. In this situation, no advancement of the pipe has occurred. Likewise, during the next falling clock 21 edge, IPIPE0 13 is high, indicating no advance of the pipe. However, at the next rising edge, the IPIPE0 13 value is in an active low state representing an advancement of instruction pipe 106. In this situation, the external emulator or debug circuitry (not shown), as discussed previously, could determine that an instruction register has been retired. The next falling edge of the clock signal 21 also indicates an advancing of the instruction registers since IPIPE0 13 is low. If the CPU 102 is executing in a loop mode, where a sequence of instructions that operate to form a loop are executed out of the instruction pipe 106 without being retired, then IPIPEO does not toggle, as the instruction pipe 106 registers IR0–IR7 are not being advanced.

The signal IPIPE1 14 is used to determine when a pipeline fetch or a pipeline flush occurs. During a falling edge of clock 21, IPIPE1 14 indicates a fetch by a low value. Likewise, if during a falling edge of clock 21 IPIPE1 14 is high, no fetch is occurring. In a similar manner, during the rising edge of clock 21 IPIPE1 14 will indicate a pipe flush by a low state, and conversely will indicate no flush has occurred if IPIPE1 14 is at a high state. Data 18 illustrates the progression of data across the internal data bus 124. The designations of data 1, data 2, and so on, reflects new instruction data on the data bus 18. The contents of fetch pointer 116 value indicates the current value contained within the fetch pointer circuitry 116, and will be referred to as fetch pointer 16. A fetch pointer 116 value of three indicates that register IR3 of instruction pipe 106 is the next instruction register location to receive data from the internal bus interface 114. Conversely, a fetch pointer 116 value of four would indicate that register IR4 will receive the next instruction from the internal bus interface 114. IPIPE2 15, as previously discussed, is used to identify which of the instruction register is available for the next incoming instruction data.

In one embodiment of the present invention, the IPIPE2 15 signal begins with a start bit. The start bit follows the first fetch after a valid idle state has occured, indicated by fetch #1 in FIG. 3. The idle state consists of signal IPIPE2 15 being high for a minimum four clock cycles of clock 21. Following an idle state, the start bit is identified by the IPIPE2 15 signal being low during a rising edge of clock 21. The value on IPIPE2 15 during the next three rising edges of clock 21 determines the fetch pointer value. As illustrated in FIG. 3, beginning at the second clock 21 rising edge after IPIPE2 15 goes low, it can be seen that IPIPE2 has the binary value 011. This indicates that instruction register IR3 is the next available instruction register in the instruction pipe 106. by receiving the fetch pointer from IPIPE2 15, an emulator (not shown) is able to determine that the incoming data 1 of data 18 will be stored into IR3. Note, that emulator software normally keeps track of the next instruction scheduled to be sent to the instruction pipeline 106. After sending the value of fetch pointer 116, the signal IPIPE2 15 begins the next idle state. Following a valid idle state on IPIPE2 15, another start bit will be asserted after the next valid fetch occurs. In FIG. 3, fetch #2 represents the next valid fetch.

FIG. 4 illustrates in tabular form the relationships between the contents of fetch pointer 116, the instruction registers IR0–IR7 in the instruction pipe 106, and the data contained in the instruction registers of the instruction pipe 106. The table represents the events that are occurring at a moment in time where fetch #2 (See FIG. 3) is occurring. At this point, the fetch pointer value received from the IPIPE2 15 signal indicates that the fetch pointer value is 4. Therefore, register IR4 in FIG. 4 is shown as receiving "incoming data 5". At this point in time, register IR0 contains data 1, instruction register 1 contains data 2, register IR2 contains data 3, register IR3 contains data 4. Since the instruction pointer value is 4, that indicates the next empty instruction register is IR4. Therefore, the emulator (not shown) is able to determine that IR4 will receive the incoming data 5, as is indicated in FIG. 4. This keeps the emulator or debugger synchronized with the instruction pipe 106. Note that instruction registers IR5–IR7 are empty and, if no instructions are retired, will contain data 6, data 7 and data 8.

By providing a mechanism whereby a single pin provides the current fill status of the instruction pipe 106, it is possible for emulators and debug software to synchronize with the CPU 102 at any point in the instruction sequence. Without having to wait for a change of instruction flow or a flush of the instruction pipe 106, a problem with the prior art is overcome. While the present invention has been illustrated and described with reference to specific embodiments, further modifications and improvements will occur to those skilled in the art. For example, IPIPE2 could provide other internal CPU status information (eg. loop mode, non-loop mode). It is to be understood, therefore, that this invention is not limited to the particular forms illustrated and that the appended claims cover all modifications that do not depart from the spirit and scope of this invention.

We claim:

1. A method for operating a data processing system, the data processing system having a central processing unit and having an external bus coupled to external terminals of the central processing unit, the external bus providing information external to the data processing system, the method comprising the steps of:

providing an instruction pipe in the central processing unit;

executing a plurality of instructions in the central processing unit; and providing first status information on the external bus via the external terminals, wherein the first status information indicates that the instruction pipe is partially full.

2. A method as in claim 1, further comprising the step of:

providing second status information on the external bus, wherein the second status information indicates that the instruction pipe is empty.

3. A method as in claim 2, wherein the first and second status information are provided on at least one integrated circuit terminal that is a part of the external terminals.

4. A method as in claim 3, wherein the first and second status information are provided, at least in part, by serially providing a sequence of binary values via an integrated circuit terminal that is a part of the external terminals whereby the collection of binary values indicates at least a portion of the first and second status information.

5. A method as in claim 3, wherein the integrated circuit terminal comprises: (1) a first external terminal that indicates whether or not an instruction has been removed from the instruction pipe; (2) a second external terminal that indicates if the instruction pipe has been flushed; and (3) a third external terminal which indicates a position of a next available instruction register within the instruction pipe.

6. A method as in claim 4, further comprising steps of:

providing a serial start bit by way of the integrated circuit terminal;

serially providing the first status information by way of the integrated circuit terminal after provision of the serial start bit; and serially providing a plurality of serial idle bits by way of the integrated circuit terminal after serial provision of the first status information.

7. A method as in claim 6, wherein said step of providing the plurality of serial idle bits further comprise a step of:

providing at least two contiguous serial bits have an opposite logic state than the serial start bit.

8. A method as in claim 7, wherein the serial start bit has a logic zero state and the plurality of serial idle bits have a logic one state.

9. A method as in claim 6, where the first and second status information are encoded for external decoding by another device.

10. A method as in claim 1, further comprising the step of:

using the first and second status information external to the central processing unit to allow a development system to determine a level of utilization of the instruction pipe at a specific point in time.

11. A method as in claim 3, further comprising steps of:

providing additional pipe information by way of a plurality of integrated circuit terminals, the additional pipe information indicating loading and unloading of the instruction pipe; and when the central processing unit is in a loop mode, disabling toggling of the plurality of integrated circuit terminals.

12. A data processor, comprising:

external bus interface circuitry; and a central processing unit, wherein the central processing unit comprises:

an instruction pipe for storing a plurality of instructions in a serially connected set of instruction registers where contents of at least one of the serially connected set of instruction registers may be shifted to another of the serially connected set of instruction registers;

a microsequencer, coupled to said instruction pipe, for receiving at least one of the plurality of instructions in a serial manner from the serially connected set of instruction registers;

an execution unit, coupled to said microsequencer, for executing the at least one of the plurality of instructions;

a fetch pointer circuit, coupled to said external bus interface circuitry for receiving at least one control signal indicating when said instruction pipe is loaded, and coupled to said microsequencer for receiving at least one control signal indicating when said instruction pipe is unloaded; and pipe tracking circuitry, coupled to said fetch pointer circuit and to said external bus interface circuitry, said pipe tracking circuitry providing a pipe status signal external to the data processor by way of said external bus interface circuitry, the pipe status signal indicating how many of the plurality of instructions are stored in the serially connected set of instruction registers of said instruction pipe.

13. A data processor as in claim 12, wherein the data processor further comprises:

an integrated circuit terminal, coupled to said external bus interface circuitry, for providing the pipe status signal external to the data processor.

14. A data processor as in claim 13, wherein the pipe status signal includes at least one start bit, a plurality of pipe depth bits, and a plurality of idle bits, which are all serially provided external to the data processor via at least one integrated circuit terminal.

15. A data processor as in claim 14, wherein the data processor further comprises:

a plurality of additional integrated circuit terminals, coupled to said external bus interface, for providing a plurality of additional pipe status signals external to the data processor, the plurality of additional pipe status signals indicating loading and unloading of the instruction pipe;

wherein said pipe tracking circuitry disables toggling of the plurality of additional integrated circuit terminals when said central processing unit is in a loop mode.

16. An apparatus for operating a data processing system having a central processor unit including a instruction pipe, and an external data bus coupled to the central processor unit, the central processor unit comprising:

a plurality of pipe registers within the instruction pipe, the plurality of pipe registers being coupled to serially receive and serially shift instructions between shift registers until eventual use by an execution unit; and a pipe tracking circuit coupled to the instruction pipe for providing a pipe fullness information, wherein the pipe fullness information identifies which of the plurality of pipe registers contain valid instructions, the pipe tracking circuit further having an output coupled to the external bus for indicating which of the plurality of pipe registers contain valid instructions.

17. The apparatus of claim 16, wherein the central processor unit comprises:

a fetch pointer for identifying a next available register in the plurality of pipe registers, wherein the fetch pointer is coupled to the pipe tracking circuit to identify which of the plurality of pipe registers contain valid instructions.

18. The apparatus of claim 16, further comprising:

the pipe tracking circuit output comprising exactly one pin, wherein the exactly one pin provides the pipe fullness information.

19. The apparatus of claim 16, further comprising:

the external data bus further comprising a clock signal; and the pipe tracking circuit coupled to the clock signal for providing the pipe fullness information to the output that is synchronous to the clock signal.

20. A method for operating a data processing system, the data processing system having a central processing unit and having an external bus having a plurality of integrated circuit terminals, the external bus providing information external to the data processing system, the method comprising the steps of:

providing an instruction pipe in the central processing unit;

executing a plurality of instructions in the central processing unit from the instruction pipe;

providing first status information on the external bus, wherein the first status information indicates a fullness level of the instruction pipe; and when the central processing unit is in a loop mode of operation, disabling subsequent toggling of the plurality of integrated circuit terminals for a period of time during the loop mode of operation.

21. A data processor comprising:

a CPU having access to an instruction pipe containing a plurality of instruction registers, the instruction pipe being coupled to store instructions for execution by the CPU; and pipe tracking circuitry coupled to the instruction pipe for monitoring a status of the pipe over time and providing such status external to the CPU via external terminals of the CPU, the pipe tracking circuitry having: (1) a first external terminal for providing first pipe status information external to the CPU; (2) a second external terminal for providing second pipe status information external to the CPU; and (3) a third external terminal for providing third pipe status information external to the CPU.

22. The data processor of claim 21 wherein the first external terminal provides first status information that indicates whether or not the instructions within the plurality of instruction registers the instruction pipe have been shifted between instruction registers.

23. The data processor of claim 22 wherein the second external terminal provides second status information that indicates whether or not a pipe fetch or a pipe flush has occurred within the instruction pipe.

24. The data processor of claim 23 wherein the third external terminal provides third status information that indicates which register within the plurality of registers is available for acceptance of a new instruction into the instruction pipe.

25. The data processor of claim 21 wherein the third external terminal provides third status information that indicates which register within the plurality of registers is available for acceptance of a new instruction into the instruction pipe.

26. The data processor of claim 25 wherein the third external terminal provides third status information by serially providing a start bit, followed by an identification value of a register within the instruction pipe, followed by an idle period, on the third external terminal.

27. The data processor of claim 25 wherein the second external terminal provides second status information that indicates whether or not a pipe fetch or a pipe flush has occurred within the instruction pipe.

28. The data processor of claim 21 wherein the second external terminal provides second status information that indicates whether or not a pipe fetch or a pipe flush has occurred within the instruction pipe.

29. A data processor comprising:

a CPU having access to an instruction pipe containing a plurality of instruction registers, the instruction pipe being coupled to store instructions for execution by the CPU; and pipe tracking circuitry coupled to the instruction pipe for monitoring a status of the pipe over time and providing such status external to the CPU via external terminals of the CPU, the pipe tracking circuitry having one external terminal for indicating whether or not a pipe fetch or a pipe flush has commenced within the instruction pipe, where the external terminal indicates the existence or lack of a pipe fetch via one of two binary values present during a first edge of a clock signal and the external terminal indicates the existence or lack of a pipe flush via one of two binary values present on a second edge of the clock signal.

30. The data processor of claim 30 wherein the first edge is a falling edge of the clock and the second edge is a rising edge of the clock.

31. A data processor comprising:

a CPU having access to an instruction pipe containing a plurality of instruction registers, the instruction pipe being coupled to store instructions for execution by the CPU; and pipe tracking circuitry coupled to the instruction pipe for monitoring a status of the pipe over time and providing such status external to the CPU via external terminals of the CPU, the pipe tracking circuitry having one external terminal for indicating a next register that is to receive the next instruction provided to the instruction pipe, the one external terminal indicating this next register via a serial protocol where a start bit is sent through the one external terminal, serially followed by a serial next register identifier, which is serially followed by an end indication.

* * * * *